US009751078B2

(12) United States Patent
Yoo et al.

(10) Patent No.: US 9,751,078 B2
(45) Date of Patent: Sep. 5, 2017

(54) NON-PRECIOUS METAL BASED WATER ELECTROLYSIS CATALYST FOR OXYGEN EVOLUTION AT ANODE AND HYDROGEN EVOLUTION AT CATHODE AND PREPARATION METHOD OF THE SAME

(71) Applicant: KOREA INSTITUTE OF SCIENCE AND TECHNOLOGY, Seoul (KR)

(72) Inventors: Sung Jong Yoo, Seoul (KR); Jaeyune Ryu, Seoul (KR); Jong Hyun Jang, Seoul (KR); Jin Young Kim, Seoul (KR); Hyoung-Juhn Kim, Seoul (KR); Sung Pil Yoon, Seoul (KR); Jonghee Han, Seoul (KR); Suk Woo Nam, Seoul (KR); Tae Hoon Lim, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 14/921,567

(22) Filed: Oct. 23, 2015

(65) Prior Publication Data
US 2016/0199821 A1 Jul. 14, 2016

(30) Foreign Application Priority Data
Jan. 9, 2015 (KR) ........................ 10-2015-0003543

(51) Int. Cl.
*B01J 27/185* (2006.01)
*B01J 35/06* (2006.01)
(Continued)

(52) U.S. Cl.
CPC .......... *B01J 27/1853* (2013.01); *B01J 35/06* (2013.01); *C25B 1/02* (2013.01); *C25B 11/035* (2013.01);
(Continued)

(58) Field of Classification Search
None
See application file for complete search history.

(56) References Cited

U.S. PATENT DOCUMENTS

2010/0233070 A1* 9/2010 Alonso-Vante ..... H01M 4/8842
423/579
2013/0180848 A1 7/2013 Lee et al.
(Continued)

FOREIGN PATENT DOCUMENTS

JP 2013-243154 A 12/2013
KR 10-0785043 B1 12/2007
(Continued)

OTHER PUBLICATIONS

Esswein et al., "Size-Dependent Activity of Co3O4 Nanoparticle Anodes for Alkaline Water Electrolysis", J. Phys. Chem. C, Jul. 28, 2009, pp. 15068-15072, vol. 113, No. 33.
(Continued)

*Primary Examiner* — Colin W Slifka
(74) *Attorney, Agent, or Firm* — Goldilocks Zone IP Law

(57) ABSTRACT

Disclosed is a non-precious metal based water electrolysis catalyst represented by CoX/C (X is at least one selected from the group consisting of P, O, B, S and N) for evolution of hydrogen and oxygen at a cathode and anode, respectively, at the same time, the catalyst including a cobalt-containing compound fixed to a carbon carrier.

10 Claims, 17 Drawing Sheets

(51) Int. Cl.
  *C25B 11/03* (2006.01)
  *C25B 11/04* (2006.01)
  *C25B 1/02* (2006.01)
  *B82Y 30/00* (2011.01)
(52) U.S. Cl.
  CPC ...... *C25B 11/0405* (2013.01); *C25B 11/0415* (2013.01); *C25B 11/0447* (2013.01); *B82Y 30/00* (2013.01)

(56) References Cited

U.S. PATENT DOCUMENTS

2014/0045098 A1    2/2014  Chung et al.
2015/0259810 A1*   9/2015  Lewis ............... C25B 11/0447
                                                          204/291

FOREIGN PATENT DOCUMENTS

| KR | 10-0918845 B1 | 9/2009 |
|----|---------------|--------|
| KR | 10-2011-0033212 A | 3/2011 |
| KR | 10-2013-0084472 A | 7/2013 |
| KR | 10-2013-0123263 A | 11/2013 |
| WO | 2006-086457 A2 | 8/2006 |
| WO | 2009/154753 A2 | 12/2009 |
| WO | 2013-150116 A1 | 10/2013 |

OTHER PUBLICATIONS

Cobo et al., "A Janus cobalt-based catalytic material for electro-splitting of water", Nature Materials, Aug. 2, 2012, pp. 1-6, vol. 11.
Bezerra et al., "A review of Fe—N/C and Co—N/C catalysts for the oxygen reduction reaction", Electrochimica Acta, Feb. 12, 2008, pp. 4937-4951, vol. 53.
Dominguez et al., "Effect of transition metal (M: Fe, Co or Mn) for the oxygen reduction reaction with non-precious metal catalysts in acid medium", International Journal of Hydrogen Energy, Jan. 2, 2014, pp. 5309-5318, vol. 39.

* cited by examiner

NON-PRECIOUS METAL BASED WATER ELECTROLYSIS CATALYST FOR OXYGEN EVOLUTION AT ANODE AND HYDROGEN EVOLUTION AT CATHODE AND PREPARATION METHOD OF THE SAME

CROSS-REFERENCE TO RELATED APPLICATION

This application claims priority to Korean Patent Application No. 10-2015-0003543, filed on Jan. 9, 2015, and all the benefits accruing therefrom under 35 U.S.C. §119, the contents of which in its entirety are herein incorporated by reference.

BACKGROUND

1. Field

The present disclosure relates to a non-precious metal based water electrolysis catalyst for both oxygen evolution at an anode and hydrogen evolution at a cathode and a method for preparing the same. More particularly, the present disclosure relates to a non-precious metal based water electrolysis catalyst based on a cobalt-containing compound fixed to a carbon carrier and a method for preparing the same.

[Description about National Support Research and Development]

This study is made by the support of core research business of Korea Ministry of Science, ICT and Future Planning under the supervision of Korea Institute of Science and Technology, and the subject name thereof is Development of Fundamental Source Technology for Preparation of High-Quality Membrane-Electrode Assembly for Polymer Electrolyte Fuel Cells Using Non-Platinum Based Catalyst (Subject Identification No.:2014003865).

2. Description of the Related Art

As energy demand has increased, active studies have been made about economical and eco-friendly substitute energy conversion and storage systems. Particularly, conversion of water into oxygen and hydrogen corresponds to core energy conversion technology and belongs to regenerated resource storage technology in the form of chemical fuel. Recently, electrochemical hydrogen production largely depends on general water electrolysis processes and chloro-alkali industry. In fact, decomposition of water is regarded as a method for supplying hydrogen in an eco-friendly, economical and sustainable manner. Therefore, development of more effective and stable catalyst electrode materials has been regarded significantly. Water electrolysis may be broadly divided into two types of half cell reactions, one of which is hydrogen evolution reaction (HER) occurring at a cathode and the other of which is oxygen evolution reaction (OER) occurring at an anode. In terms of practical applicability, oxygen evolution reaction has a more complicated mechanism and requires a larger overvoltage as compared to hydrogen evolution reaction, and thus development of an efficient and stable catalyst for oxygen evolution reaction is very important to accomplish commercialization of large-scale hydrogen production based on water electrolysis. Although precious metal oxide catalysts such as $RuO_2$ and $IrO_2$ show high activity, they are not amenable to large-scale application due to their high cost and scarcity. Therefore, there has been a need for technology of developing an efficiency catalyst capable of substituting for high-cost catalysts from materials abundant in the earth. Particularly, since oxygen evolution reaction under acidic atmosphere severely limits the use of a non-precious metal based catalyst, there have been suggested non-precious metal based catalysts for oxygen evolution under alkaline atmosphere. Meanwhile, also in the case of hydrogen evolution reaction, development of non-platinum based catalysts has been conducted actively to substitute for expensive Pt-based catalysts. However, unlike the case of oxygen evolution reaction, there is a problem in that the catalysts function only under acidic atmosphere. When viewed from the point of using non-precious metal based catalysts, such incompatibility is regarded as a big obstacle considering the ultimate completion of water electrolysis based on non-precious metal based catalysts. As a result, there has been an imminent need for developing a non-precious metal based catalyst for hydrogen evolution reaction under alkaline atmosphere.

Referring to oxygen evolution reaction, cobalt has been given many attentions among non-precious metals. There have been designed cobalt oxide-based oxygen evolution reaction (OER) catalysts including $Co_3O_4$, $Co_3O_4$-based hybrid and substitute cobaltite ($MxCo_3-xO_4$) for water oxidation potential.

In addition, more recently, cobalt phosphide (CoP) has been given many attentions by virtue of a low charge-discharge potential and unique magnetic property. However, the electrocatalytic surface property of cobalt phosphide, particularly the property at the oxidation potential and characterization thereof as an oxygen evolution reaction catalyst have been hardly made.

REFERENCES

Non-Patent Documents

A. J. Esswein, M. J. McMurdo, P. N. Ross, A. T. Bell and T. D. Tilley, J. Phys. Chem. C, 2009, 113, 15068.

SUMMARY

The present disclosure is directed to providing a method for preparing a cobalt-containing non-precious metal based water electrolysis catalyst as an active material that allows simultaneous evolution of hydrogen and oxygen at a cathode and anode, respectively, provides high efficiency at low cost, and has excellent durability.

In one aspect, three is provided a non-precious metal based water electrolysis catalyst represented by the following Chemical Formula 1 for evolution of hydrogen and oxygen at a cathode and anode, respectively, the catalyst including a cobalt-containing compound fixed to a carbon carrier:

$$CoX/C \qquad \text{[Chemical Formula 1]}$$

wherein X is at least one selected from the group consisting of P, O, B, S and N.

According to an embodiment, X in the above formula may be at least one selected from the group consisting of P, B, S and N.

According to another embodiment, X in the above formula may be P.

According to still another embodiment, the cobalt-containing compound may be nanoparticles surrounded with an amorphous layer having a thickness of 0.1-7 nm.

According to still another embodiment, the amorphous layer may include Co, X and O.

According to still another embodiment, the cobalt-containing compound may be nanoparticles having a particle size of 5-100 nm.

According to still another embodiment, the cobalt-containing compound may be nanoparticles having a particle size of 5-30 nm.

According to still another embodiment, the cobalt-containing compound may have oxide of X on the surface thereof.

According to still another embodiment, the cobalt-containing compound may have phosphate on the surface thereof.

According to still another embodiment, the catalyst may be used in an alkaline solvent.

According to still another embodiment, the catalyst may have cobalt with an oxidation number of 3 or higher through activation at the oxidation potential.

According to yet another embodiment, the catalyst may be porous and have a nanoweb structure.

In another aspect, there is provided a method for preparing a non-precious metal based water electrolysis catalyst for evolution of hydrogen and oxygen at an anode and cathode, respectively, the method including: reacting a Co precursor with a X precursor (wherein X is at least one selected from the group consisting of P, O, B, S and N) to form a Co—X precursor complex; and adding a solution of the Co—X precursor complex to a carbon-containing solution to obtain a cobalt-containing compound fixed to a carbon carrier.

According to an embodiment, the method may further include washing the cobalt-containing compound fixed to a carbon carrier and heat treating it under argon atmosphere.

According to an embodiment, the Co precursor may be at least one selected from the group consisting of cobalt acetylacetonate, cobalt acetate, cobalt chloride and cobalt carbonyl.

According to another embodiment, the X precursor may be at least one selected from the group consisting of trioctylphosphine (TOP), trioctylphosphine oxide (TOPO) and triphenyl phosphide.

According to still another embodiment, the carbon-containing solution may have a temperature of 200-400° C.

According to still another embodiment, the solution of the Co—X precursor complex may be added dropwise to the carbon-containing solution.

According to still another embodiment, the solution of the Co—X precursor may be added to the carbon-containing solution at a rate of 30-150 mL/h.

According to yet another embodiment, the heat treatment may be carried out by heating to 300-400° C.

The non-precious metal based water electrolysis catalyst disclosed herein includes cobalt-containing nanoparticles fixed to a carbon carrier and the nanoparticles are surrounded with an amorphous layer. Under the oxidation potential condition where oxygen evolution occurs, the catalyst provides excellent oxygen evolution reaction activity, while the nanoparticles are converted to a novel nanostructure of porous nanoweb having a high oxidation number through in-situ activation. The catalyst disclosed herein also has excellent durability and particularly shows excellent oxygen evolution reaction efficiency in an alkaline solvent or alkaline electrolyte. In addition, under the reduction potential condition where hydrogen evolution occurs, the catalyst shows excellent hydrogen evolution activity. Further, the method for preparing a water electrolysis catalyst for evolution of oxygen and hydrogen disclosed herein is simple and economic, and thus shows high efficiency.

DETAILED DESCRIPTION

Figure 1:
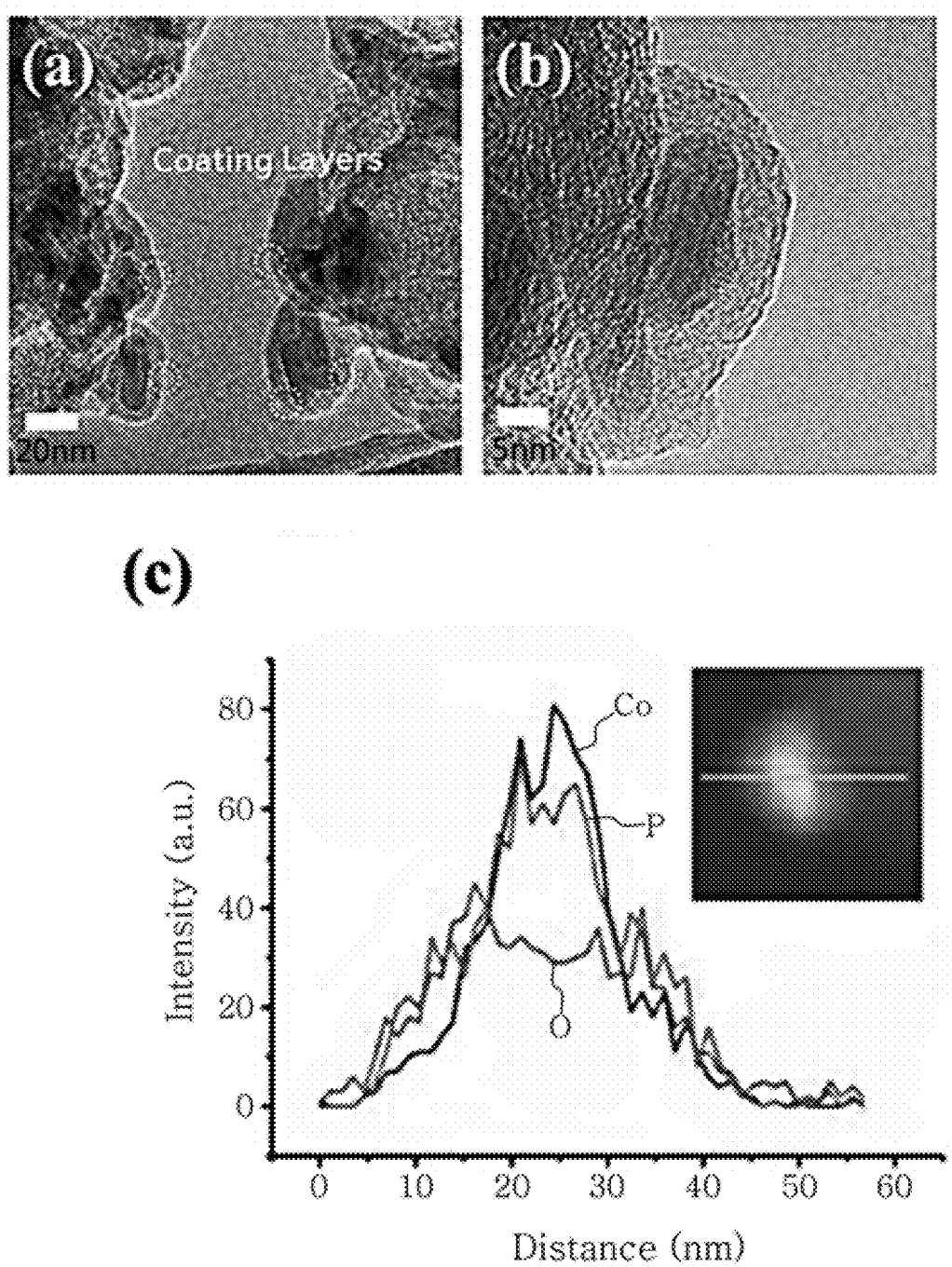
FIG. 1 shows a transmission electron microscopy (TEM) image (portion a), high-resolution TEM (HR-TEM) image (portion b), and energy dispersive spectroscopy (EDS) line profiling scan (portion c) of the as-prepared form of catalyst for hydrogen and oxygen evolution.

Exemplary embodiments now will be described more fully hereinafter so that the present disclosure will be thorough and complete, and will fully convey the scope of the present disclosure to those skilled in the art.

The inventors of the present disclosure have found that the surface of CoP (cobalt phosphide) tends to be oxidized under the effect of oxaphilic phosphor (P) and forms a unique surface structure through the complexation by providing the cobalt center with cationic environment. While the present CoP shows excellent hydrogen evolution quality at the reduction potential, it is transformed into a completely different unique catalyst structure having a higher oxidation number through a specific activation process at a higher oxidation potential, i.e., under the potential condition where oxygen evolution occurs. In other words, the present disclosure relates to a bifunctional water electrolysis catalyst functioning at both an anode and a cathode, including CoP nanoparticles fixed to a carbon carrier, and having high electrocatalytic efficiency to hydrogen and oxygen evolution reaction in an alkaline solvent.

In one aspect, there is provided a non-precious metal based water electrolysis catalyst represented by the following Chemical Formula 1 for simultaneous evolution of hydrogen and oxygen at a cathode and anode, respectively, the catalyst including a cobalt-containing compound fixed to a carbon carrier:

CoX/C [Chemical Formula 1]

wherein X is at least one selected from the group consisting of P, O, B, S and N.

The catalyst disclosed herein includes a cobalt-containing compound fixed to a carbon carrier, represented by the above Chemical Formula 1, and a precursor material thereof.

Herein, the cathode is also referred to as a reduction electrode and the anode is also referred to as an oxidation electrode.

Herein, X is an oxaphilic element. Particularly, X may be at least one selected from the group consisting of P, B, S and N, and more particularly P.

The carbon carrier is not particularly limited and may be a carbon structure ensuring conductivity. Particularly, the carbon carrier may be at least one selected from the group consisting of carbon black, carbon nanotubes and graphene, more particularly carbon black.

The cobalt-containing compound may be nanoparticles having a nano-scaled size. The cobalt-containing compound nanoparticles may have a particle size of 5-100 nm, particularly 5-30 nm, and more particularly 5-10 nm. When the cobalt-containing compound nanoparticles have a particle size less than 5 nm, there is a problem in that rapid degradation occurs. When the nanoparticles have a particle size larger than 100 nm, there is a problem in that the surface area is too small to carry out hydrogen evolution reaction. In the oxygen evolution reaction, the shape (length) and size of the nanoparticles may not have a significant relationship with the catalytic quality.

The cobalt-containing compound may be nanoparticles surrounded with an amorphous layer (or amorphous shell) having a thickness of 0.1-7 nm. Particularly, the amorphous layer may have a thickness of 0.5-5 nm, more particularly 1-5 nm. When the amorphous layer has a thickness less than 0.1 nm, there is a problem in terms of durability. When the amorphous layer has a thickness larger than 7 nm, there is a problem in terms of catalytic activity.

The amorphous layer may include Co, X and O.

In the cobalt-containing compound fixed to a carbon carrier, cobalt (Co) may be present in an amount of 1-30 wt %, particularly 10-20 wt % (based on the weight of the cobalt-containing compound). When the amount of cobalt (Co) is less than 1 wt %, it is difficult to obtain catalytic efficiency. When the amount of cobalt (Co) is larger than 30 wt %, there is no additional effect upon catalytic quality.

In addition, the cobalt-containing compound may have oxide of X on the surface thereof. Particularly, the cobalt-containing compound may have abundant phosphate on the surface thereof when X is phosphorus. The catalyst for hydrogen and oxygen evolution disclosed herein is characterized in that it has abundant oxidized forms of X, such as phosphate, on the surface of the cobalt-containing compound. It is thought that the spontaneous surface oxidation process of the cobalt-containing compound in the catalyst disclosed herein makes the surface of nanoparticles have more abundant cobalt oxide and phosphate.

The catalyst for evolution of hydrogen and oxygen disclosed herein may be used in an alkaline solvent. There is no particular limitation in the alkaline solvent (or alkaline electrolyte), as long as it shows alkaline property. For example, the alkaline solvent may be at least one solvent containing hydroxide ions selected from the group consisting of NOH, NaOH and CsOH. Particularly, the alkaline solvent may be 0.1M KOH, 1M KOH, 0.1M NaOH, 1M NaOH, 0.1M CsOH and 1M CsOH. The catalyst for evolution of hydrogen and oxygen disclosed herein has excellent oxygen and hydrogen evolution activity in an alkaline solvent.

In another aspect, there is provided a method for preparing a non-precious metal based water electrolysis catalyst for evolution of hydrogen and oxygen at a cathode and anode, respectively, the method including: reacting a Co precursor with a X containing precursor (wherein X is at least one selected from the group consisting of P, O, B, S and N) to form a Co—X precursor complex; and adding a solution of the Co—X precursor complex to a carbon-containing solution to obtain a cobalt-containing compound fixed to a carbon carrier.

The method for preparing a water electrolysis catalyst for evolution of hydrogen and oxygen disclosed herein is carried out in a single reactor, and thus may be performed substantially in a one-step process. In addition, the method disclosed herein uses cheap elements, and thus is very efficient and economic. Hereinafter, the method for preparing a non-precious metal based water electrolysis catalyst for evolution of hydrogen and oxygen disclosed herein will be explained in detail.

First, a Co precursor is reacted with an X containing precursor (wherein X is at least one selected from the group consisting of P, O, B, S and N) to form a Co—X precursor complex.

The Co precursor may be at least one selected from the group consisting of cobalt acetylacetonate, cobalt acetate, cobalt chloride and cobalt carbonyl, and particularly cobalt acetylacetonate.

In addition, the X containing precursor is an organic chemical species containing an element X. Particularly, the X containing precursor may be a P containing precursor and specifically may be at least one selected from the group consisting of trioctylphosphine (TOP), trioctylphosphine oxide (TOPO) and triphenyl phosphide, more specifically trioctylphosphine.

Next, a solution of the Co—X complex is added to a carbon-containing solution to obtain a cobalt-containing compound fixed to a carbon carrier.

The carbon-containing solution may be preheated to a temperature of 200-400° C., particularly 250-350° C., and more particularly 280-320° C. When the carbon-containing solution has a temperature lower than 200° C., addition of phosphorus into cobalt is not accomplished. When the carbon-containing solution has a temperature higher than 400° C., there is a problem of dangerousness due to the temperature excessively higher than the boiling point of solvent. In general, incorporation of phosphorus into cobalt occurs at a temperature of about 300° C.

In the method, when adding the solution of the Co—X precursor complex to the carbon-containing solution, the former may be added dropwise to the latter.

Particularly, the solution of the Co—X precursor complex may be added to the carbon-containing solution at a rate of 30-150 mL/h. When the addition rate is less than 30 mL/h, nanoparticles having an elongated rod shape are formed. When the addition rate is more than 150 mL/h, nanoparticles having a short oval shape are formed. Thus, when the addition rate is 30-150 mL/h, particularly about 120 mL/h, it is possible to provide CoX nanoparticles with an oval shape between a rod-like shape and a circular shape.

Then, the method disclosed herein may further include washing the resultant cobalt-containing compound fixed to the carbon carrier and carrying out heat treatment under argon atmosphere.

During the heat treatment, heating may be carried out to 300-400° C., particularly to a temperature of about 360° C. for about 30 minutes to 1 hour. The heat treatment under argon atmosphere induces diffusion of cobalt and X, thereby forming a thicker outer layer (shell).

Hereinafter, an embodiment of the method for preparing a water electrolysis catalyst for evolution of hydrogen and oxygen disclosed herein will be explained.

According to an embodiment, trioctylphosphine (TOP) is used as a phosphorus (P) precursor (phosphorus (P) source), and the P precursor is used to formation a Co-TOP complex. Thermal decomposition of the cobalt complex in a solution containing Vulcan XC-72 in a single reactor (pot) provides a hybrid (CoP/C) of CoP nanoparticles/carbon black. Particularly, a Co-TOP complex formed from cobalt acetylacetonate and trioctylphosphine is added dropwise to a carbon suspension containing oleylamine at a high temperature of about 300° C. Then, a reaction between the Co monomer and trioctylphosphine is stimulated instantly and CoP nanoparticles (~20 nm) are formed on the carbon carrier at a cobalt content of 15 wt %. The addition rate of the Co-TOP complex is about 120 mL/h or less. This is an important factor for preparing nanoparticles having an oval shape between a rod-like shape and a circular shape.

After the reaction, washing and high-temperature heat treatment (about 360° C., about 1 hour) under argon atmosphere may be further carried out.

Right after preparing CoP/C in the above-mentioned manner, the resultant CoP/C is imaged by transmission electron microscopy (TEM) (portion a, FIG. 1), high-resolution TEM (HR-TEM) (portion b, FIG. 1), and energy dispersive spectroscopy (EDS) line profiling scan (portion c, FIG. 1).

In addition, the CoP nanoparticles are surrounded with an amorphous layer (or an amorphous shell) having a thickness of 5 nm or less, and the amorphous layer includes cobalt, phosphorus and oxygen (see, portion c of FIG. 1). Before the heat treatment, the outer shell has a thickness of about 1-2 nm. It is thought that the condition of heat treatment (annealing) applied to the CoP nanoparticles induces diffusion of cobalt and phosphorus and allows formation of a thicker outer shell.

The catalyst disclosed herein includes cobalt having a high oxidation number of 3 or more through the activation at the oxidation potential.

The present disclosure relates to a water electrolysis electrochemical catalyst for simultaneous evolution of hydrogen and oxygen at a cathode and anode, respectively. The catalyst disclosed herein uses cobalt phosphide nanoparticles applied to oxygen evolution reaction (OER) occurring at an anode and to hydrogen evolution reaction (HER) occurring at a cathode at the same time. Thus, the catalyst disclosed herein is a water electrolysis electrochemical catalyst for simultaneous evolution of hydrogen and oxygen at a cathode and anode, respectively. The catalyst for evolution of hydrogen and oxygen disclosed herein is obtained through a single process including thermal decomposition and heat treatment, by which the surface properties of cobalt phosphide nanoparticles are changed to form an amorphous and oxidized surface abundant in phosphate. As a result, the catalyst disclosed herein shows excellent hydrogen and oxygen evolution reaction efficiency, i.e. higher current and more rapid current onset of catalyst, and has excellent stability and durability. Particularly, during oxygen evolution reaction, the catalyst disclosed herein becomes have a higher oxidation number and unique porous nanoweb structure, while the original catalyst structure is converted into an activated form.

The activated OER catalyst disclosed herein is porous and has a nanoweb structure. As used herein, 'nanoweb structure' means a structure of nanoparticles aligned in a specific direction and entangled with each other like a spider web.

The examples and experiments will now be described. The following examples and experiments are for illustrative purposes only and not intended to limit the scope of the present disclosure.

[Example 1] Preparation of CoP/C

First, 20 mL of 1,2-octadecene solution containing 0.1 g of carbon black (Vulcan XC-72) and 20 mL of oleylamine is dispersed homogeneously through ulrasonication for about 1 hour and heated to 300° C. To the suspension heated to 300° C., a Co-TOP complex produced by heating a solution containing 0.112 g of cobalt acetylacetonate and 7.5 mL of trioctylphosphine (TOP) at about 80° C. for about 1 hour is added dropwise at a rate of about 120 mL/h, followed by stirring while maintaining the temperature (300° C.) for 4 hours. The resultant reaction mixture is cooled to room temperature and then purified through filtering using an excessive amount (1 L×3) of ethanol. Then, the CoP/C sample dried under reduced pressure is heat treated at 360° C. under argon atmosphere for 1 hour (warmed to a temperature of 360° C. for 30 minutes) and cooled gradually to room temperature (about 20° C.) to obtain finished CoP/C.

[Comparative Example 1] Preparation of $Co_3O_4$/C

First, 0.5 mL of oleylamine and 1 mL of triple distilled water are added rapidly to 15 mL of a solution of 1-octanol containing 0.26 g of cobalt perchlorate hexahydrate (Aldrich) at 60° C. Next, the resultant mixture is added rapidly to 45 mL of an ultrasonicated 1-octanol solution of 1.167 g of carbon black (Vulcan XC-72) at 60° C. The resultant final reaction mixture is heated from 60° C. to 160° C. and stirred for 12 hours to obtain $Co_3O_4$/C. When carrying out heat treatment under air flow, $Co_3O_4$/C is obtained without any change in shape.

[Test Example 1] Cyclic Voltammetry Determination

Figure 2A:
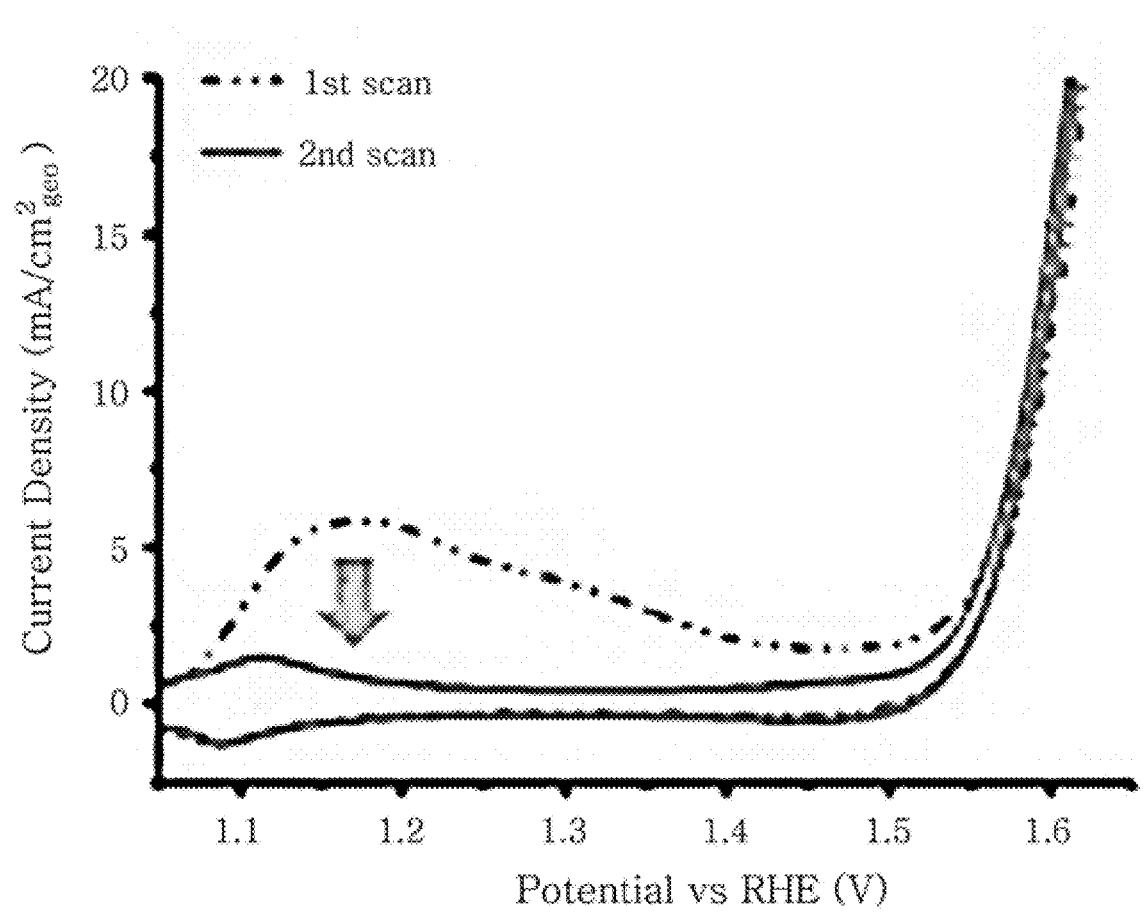
FIG. 2A to 2C show electrochemical data illustrating the catalytic activation of the catalyst for hydrogen and oxygen evolution according to an embodiment at an anode, wherein portion a shows cyclic voltammetry (CV) data, portion b shows an initial oxygen evolution reaction (OER) polarization graph, and portion c shows a Tafel graph based on the data in portion b.
Figure 2B:
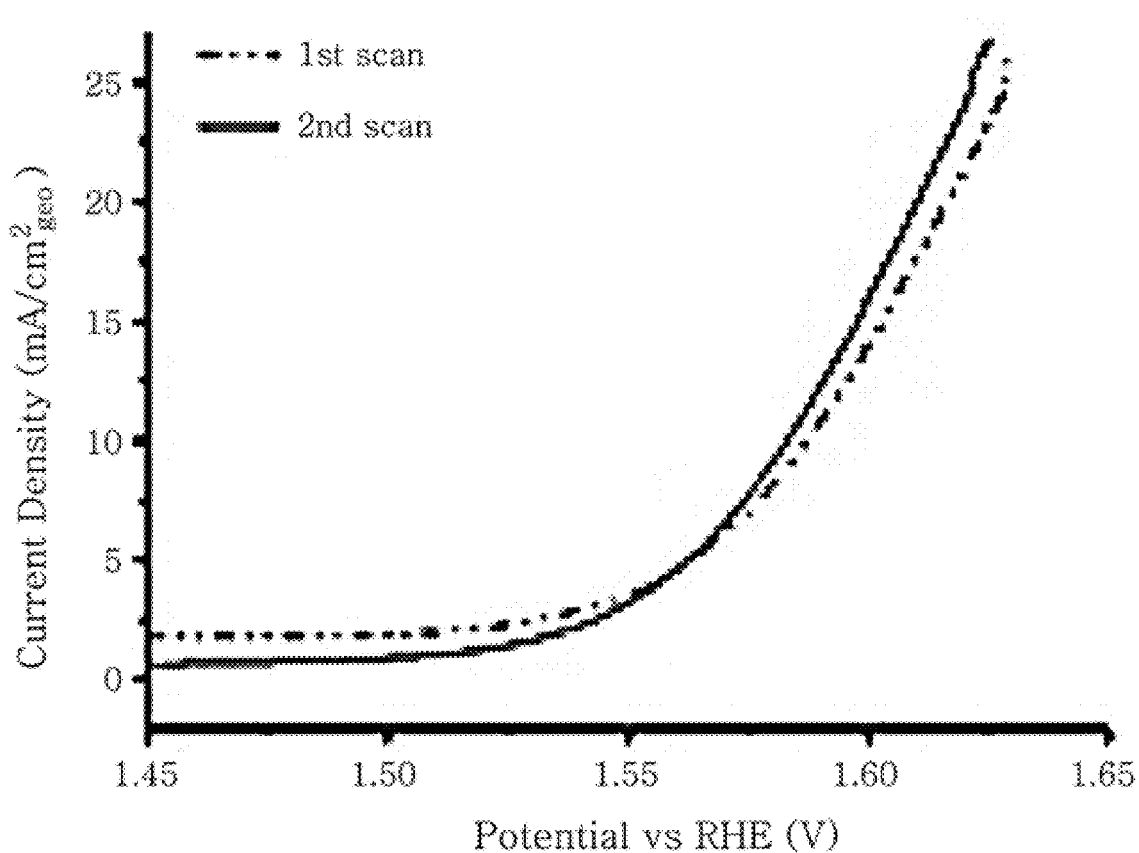
Figure 2C:
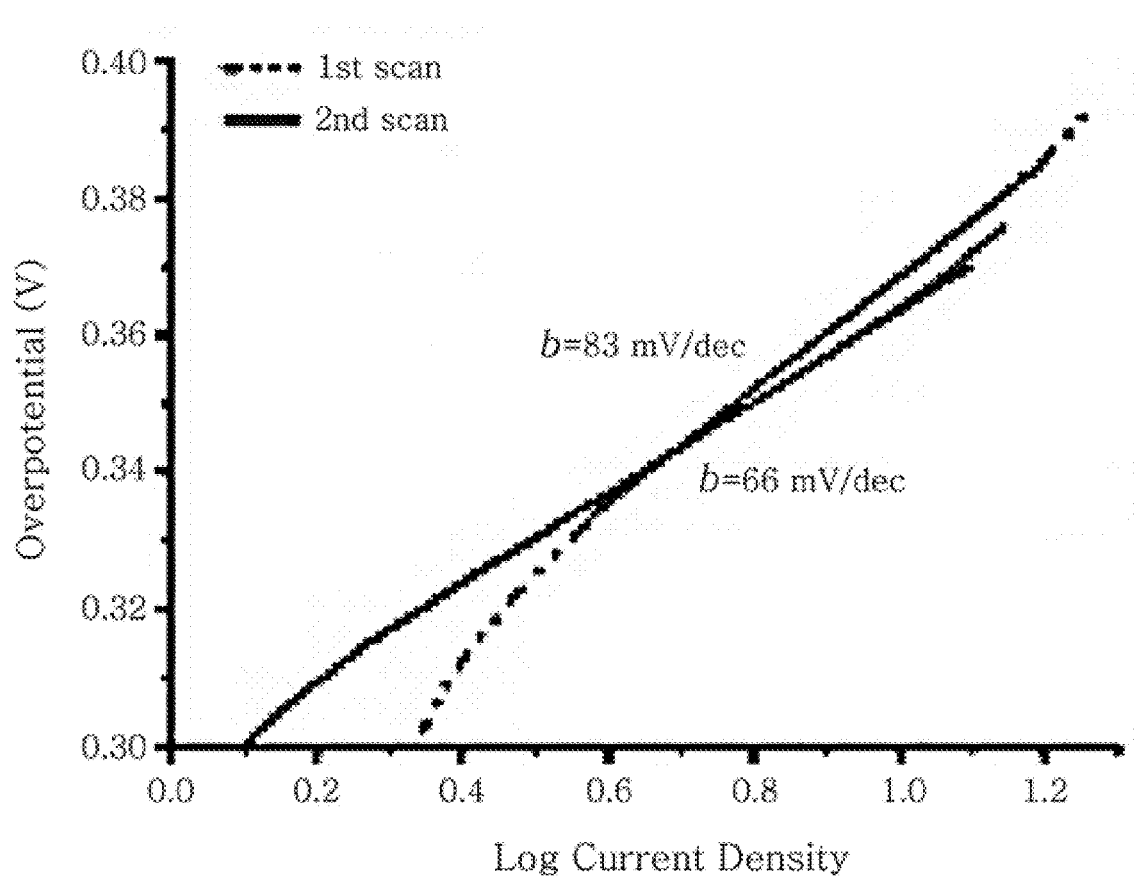

To determine the electrochemical properties of the CoP/C catalyst according to Example 1, cyclic voltammetry near the oxygen evolution reaction onset is carried out for the catalyst by a potential sweep method in 0.1M KOH solution (pH 13) at a sweep rate of 5 mV/s. The catalyst is loaded in an amount of 0.05 mg Co/cm$^2$. The results are shown in portion a, FIG. 2. In portion a of FIG. 2, the region represented by an arrow mark shows a potential range where Co(III/II) redox reaction occurs. A change in current of the second scan decreased significantly as compared to the first scan suggests that the catalyst is oxidized irreversibly. In addition, when view from the oxygen evolution reaction (OER) polarization curve (portion b, FIG. 2), it can be seen from the second scan that the catalytic quality is improved. Further, a change in Tafel slope shows that OER kinetics is improved in-situ (portion c, FIG. 2). In brief, it can be seen that activation of the catalyst proceeds in OER upon the exposure to the oxidation potential.

Figure 3:
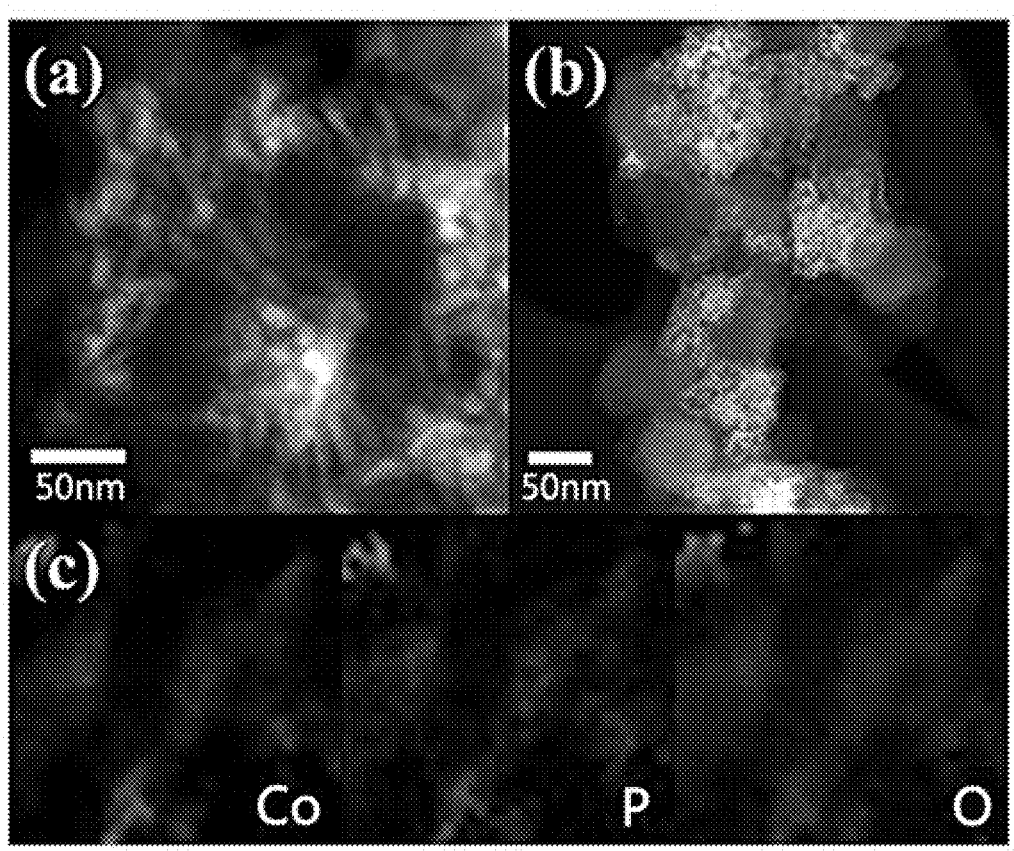
FIG. 3 shows a scanning transmission electron microscopy (STEM) image (portion a) right after the preparation, STEM image (portion b) after oxygen evolution reaction and after the activation of an anode, and EDS mapping data (portion c) after oxygen evolution reaction and after the activation of an anode.
Figure 4A:
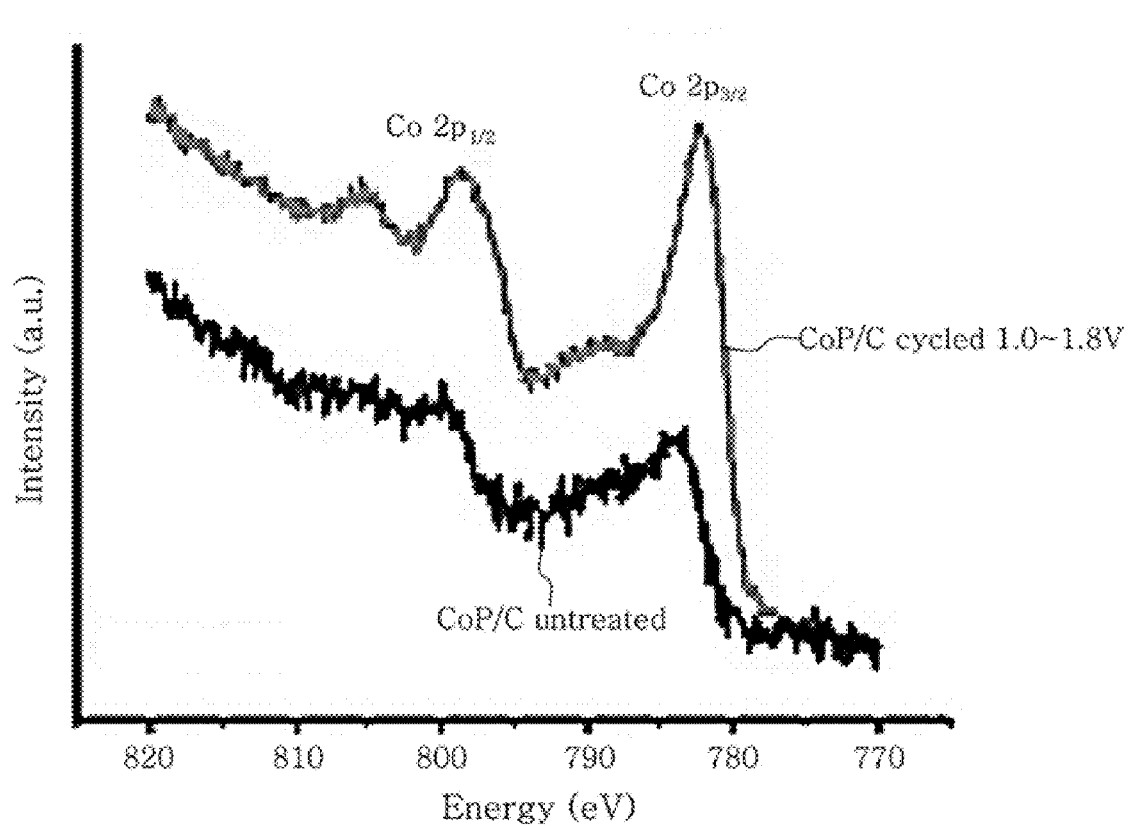
FIG. 4A to 4E show X-ray photoelectron spectroscopy (XPS) image (portions a and b) before/after the exposure to the oxidation potential, X-ray absorption near edge structure (XANES) data and extended X-ray absorption fine structure (EXAFS) data (portions c and d) before/after the exposure to the oxidation potential, for the present CoP/C, and a schematic view (portion e) for the molecular cluster form of cobaltate.
Figure 4B:
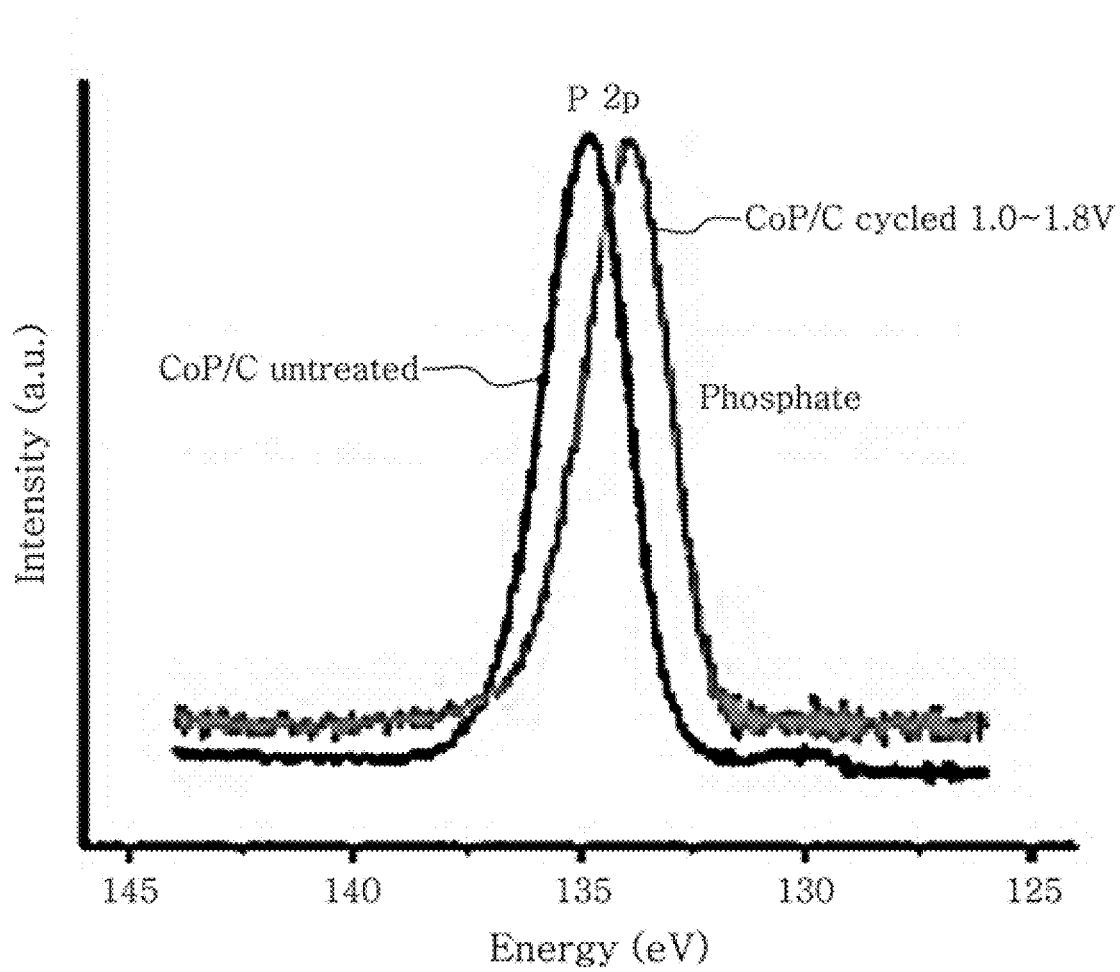
Figure 4C:
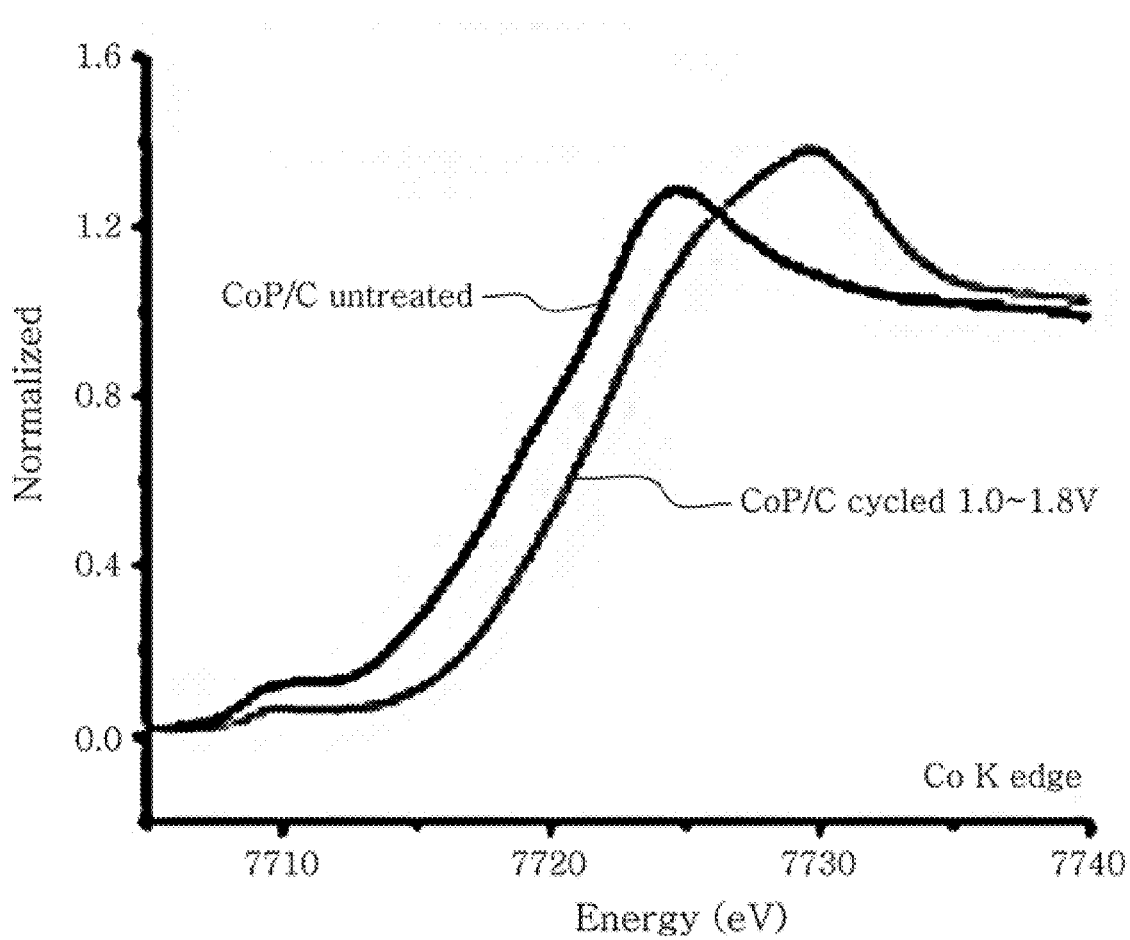
Figure 4D:
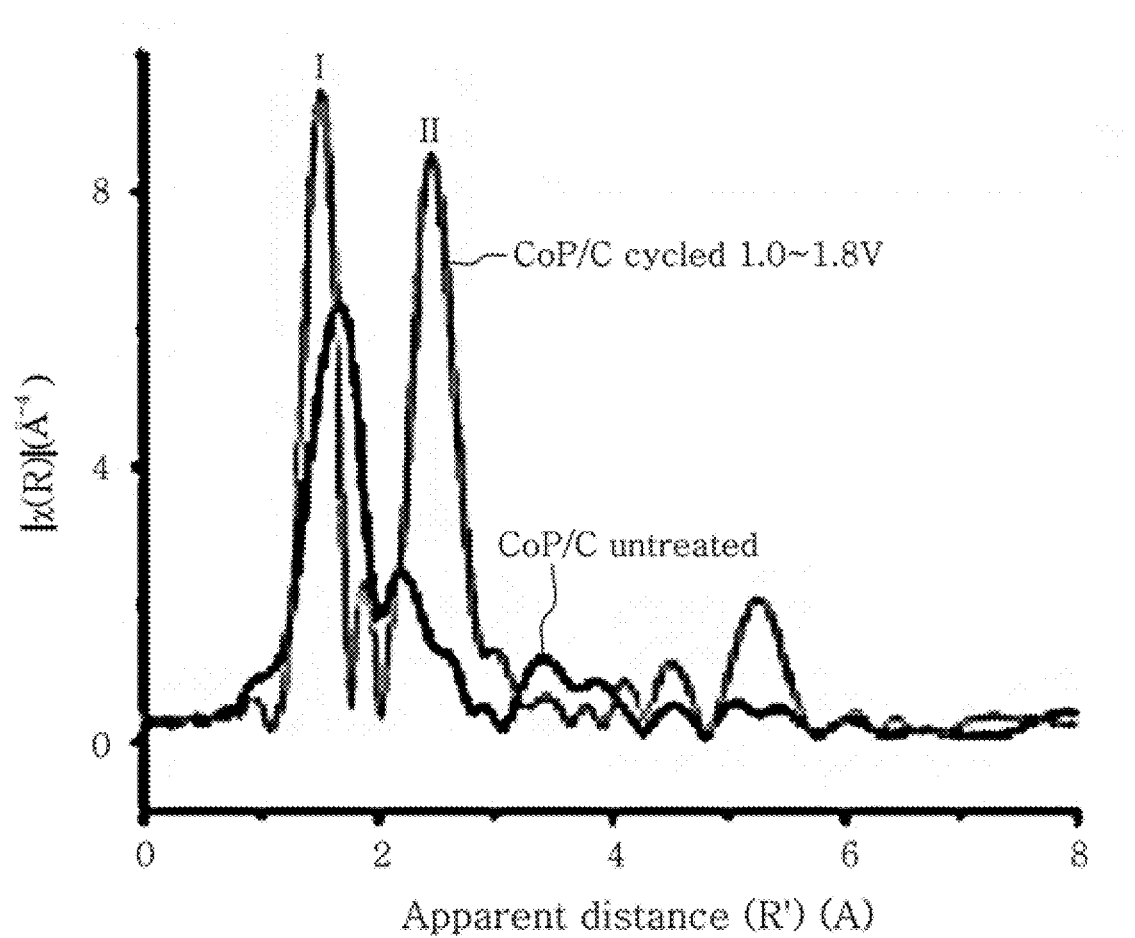
Figure 4E:
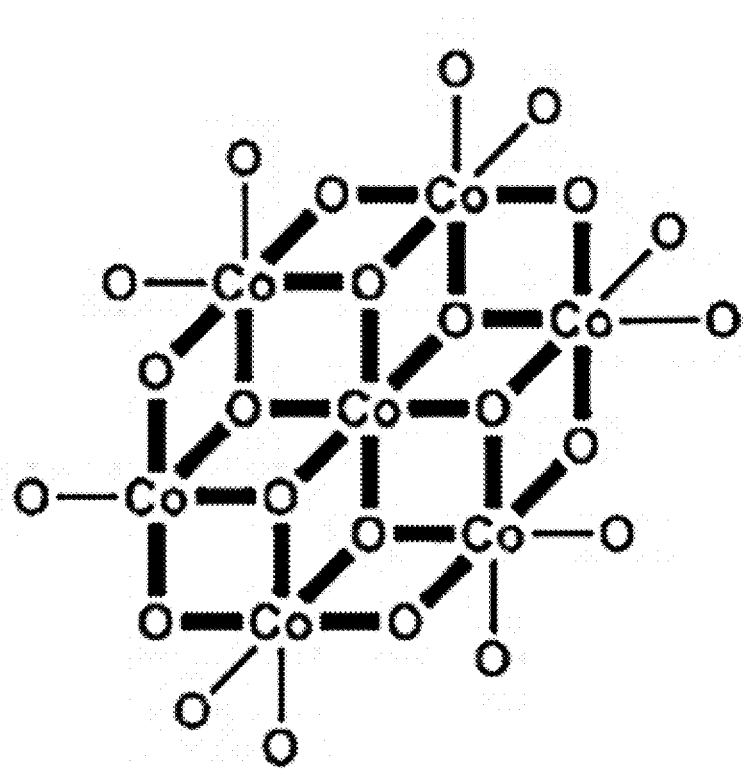
Figure 5A:
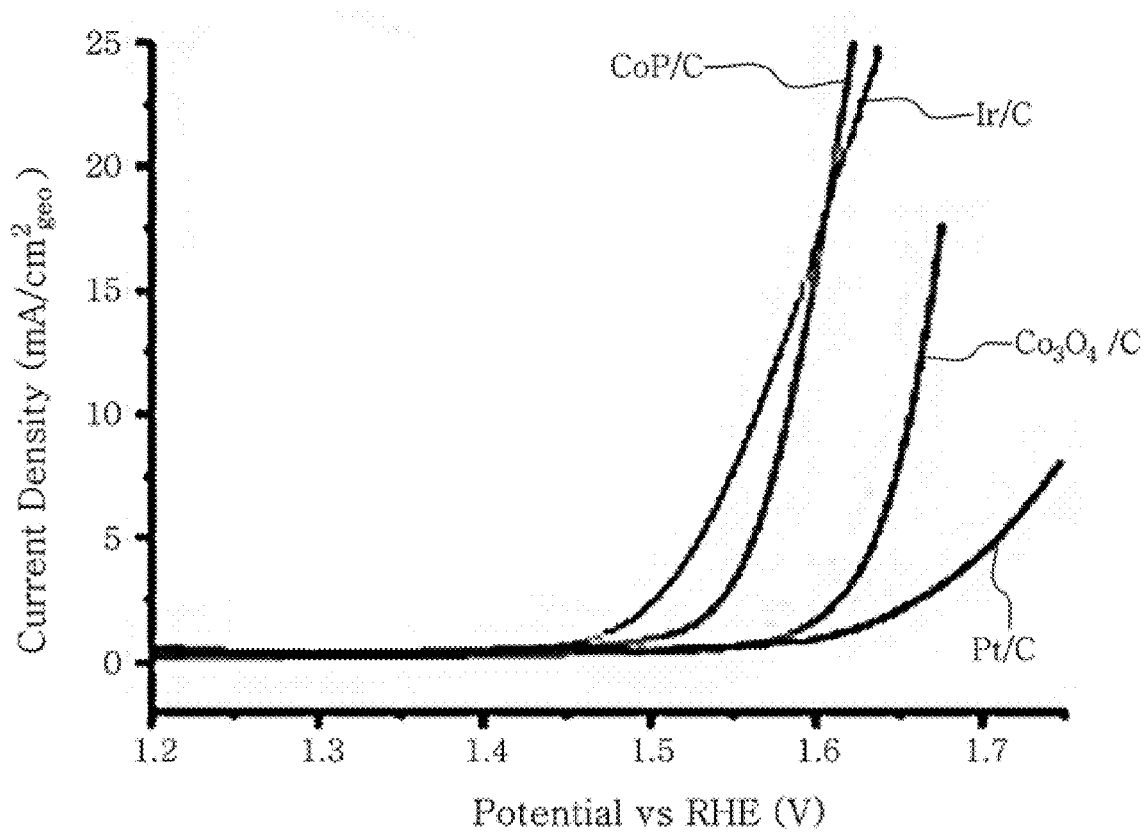
FIG. 5A to 5E show an oxygen evolution reaction polarization curve (portion a), Tafel plot (portion b), durability evaluation results (portions c and d), and an STEM image after the durability evaluation, for the present CoP/C.
Figure 5B:
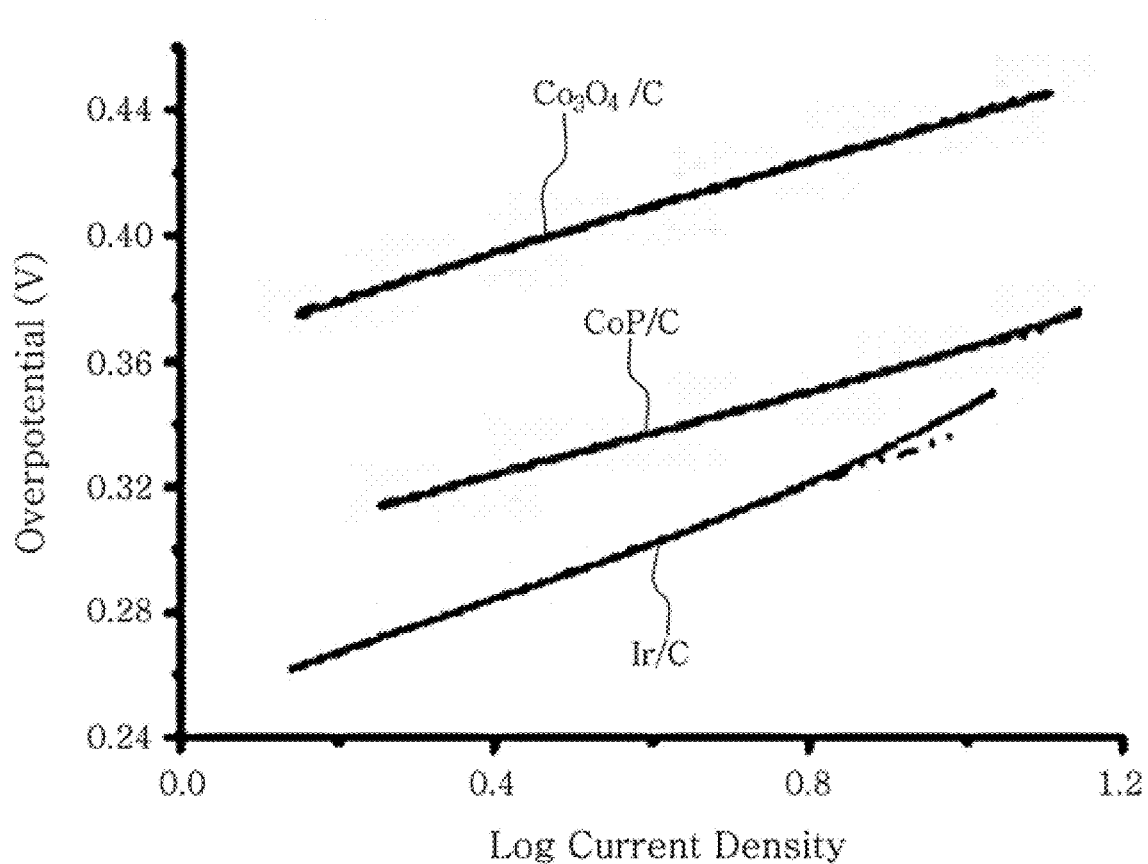
Figure 5C:
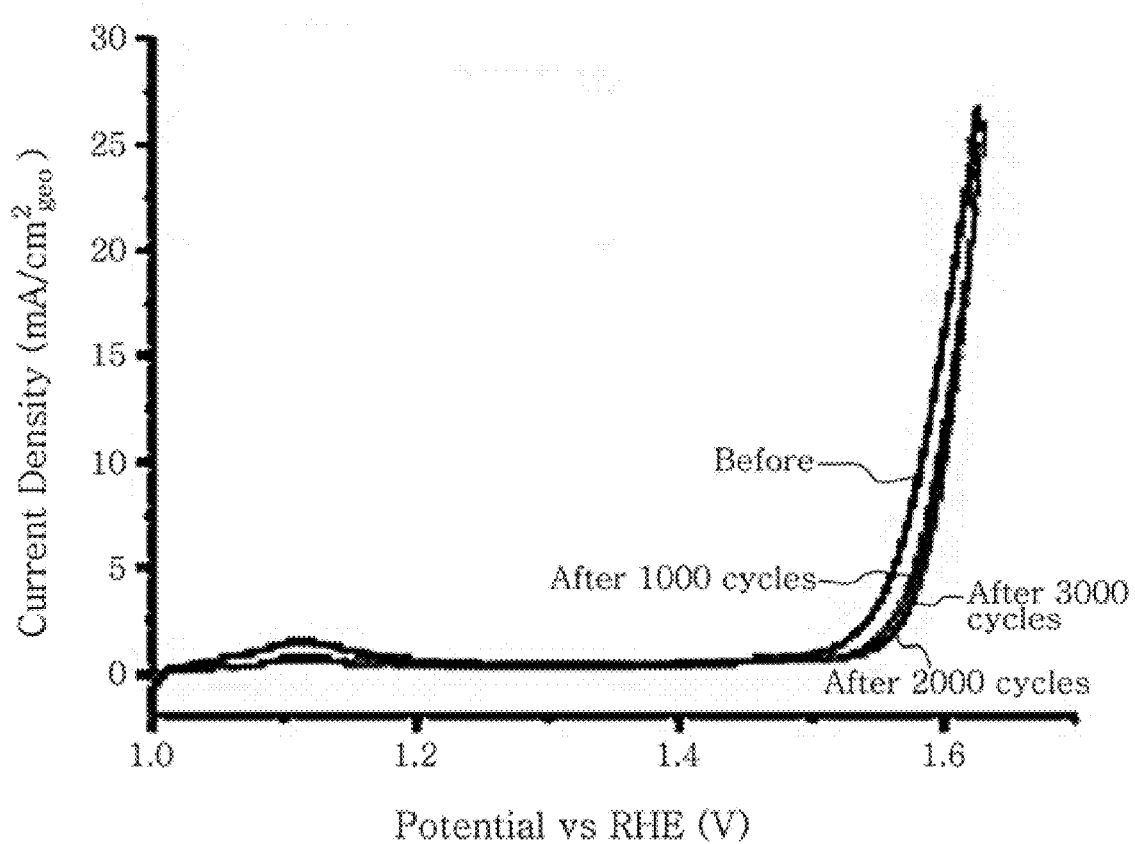
Figure 5D:
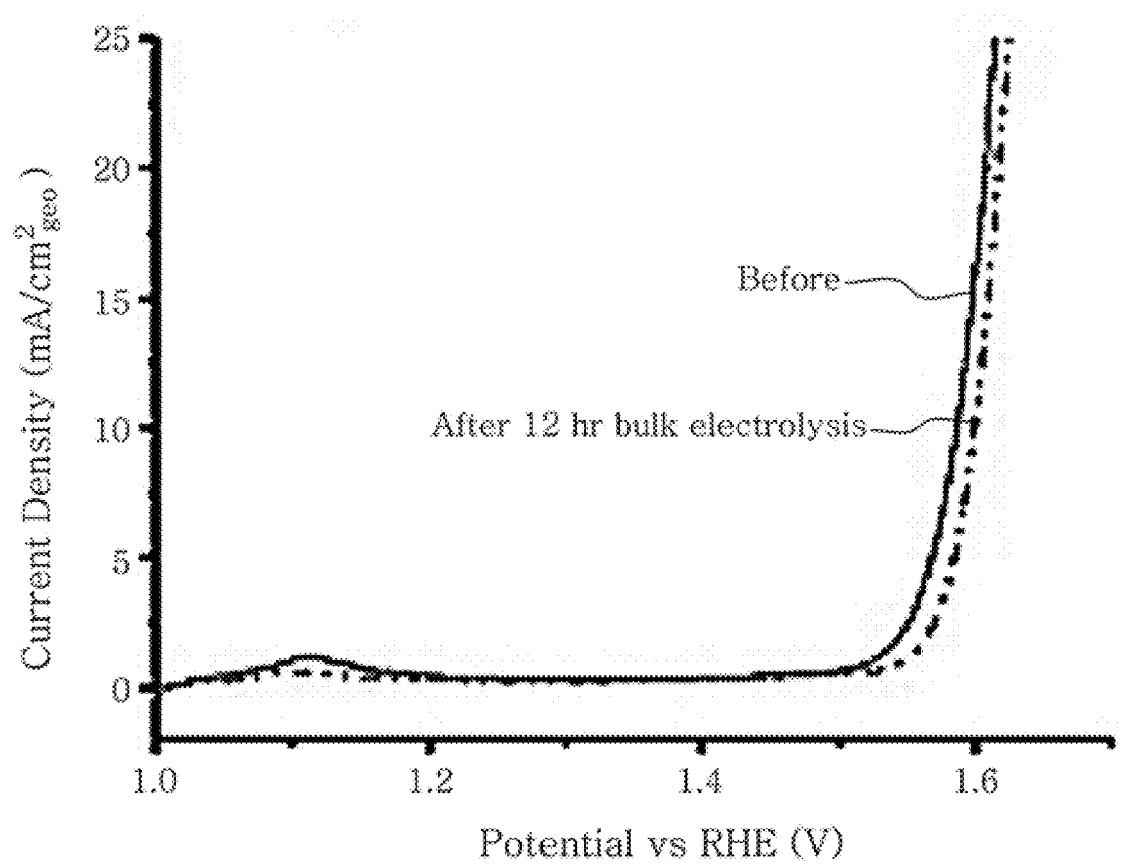
Figure 5E:
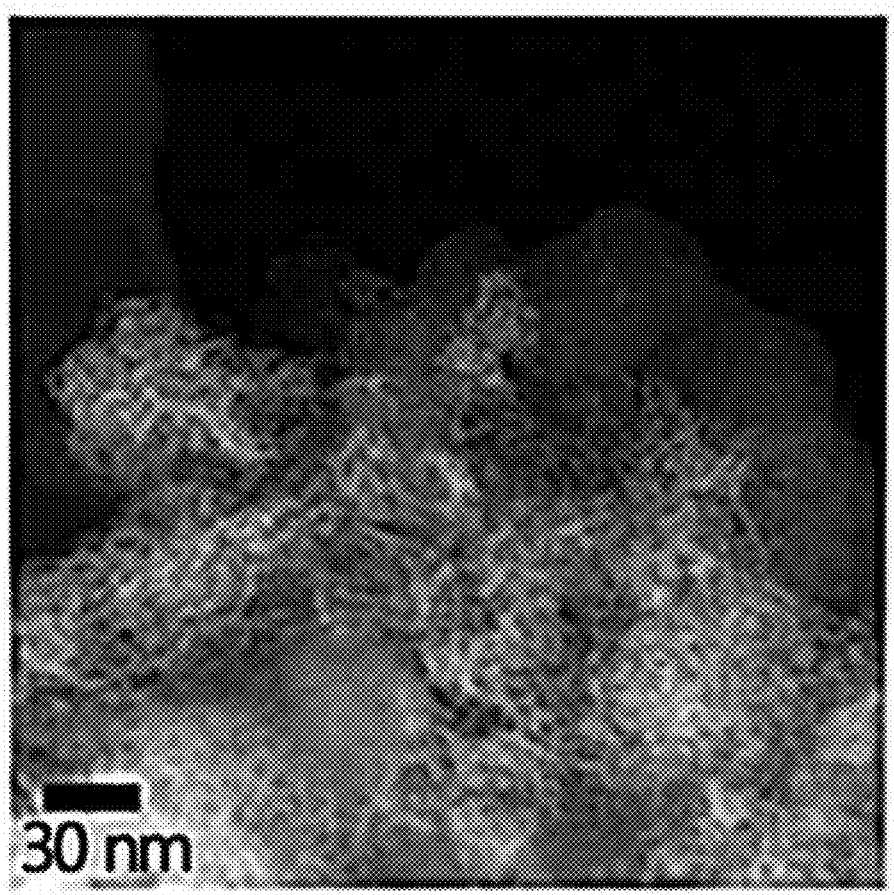

[Test Example 2] Analysis of Nanostructure Before and after In-Situ Activation Process at Oxidation Potential After the activation of the catalyst determined from Test Example 1, a change in nanostructure of the catalyst is investigated through scanning transmission electron microscopy (STEM) and energy dispersive spectroscopy (EDX)

mapping (FIG. 3). A structural change of the CoP/C catalyst exposed to the potential including the OER region is shown in portion b, FIG. 3. When the original rod-like nanoparticles (portion a, FIG. 3) are exposed to the oxidation potential (1.0-1.8 V), the catalyst is converted into a porous nanoweb structure (portion b, FIG. 3). It is shown through EDX mapping technology that Co, P and O elements are observed also in such a changed nanostructure still in the same positions (portion c, FIG. 3).

Test Example 3

The CoP/C catalyst according to Example 1 is investigated by X-ray photoelectron spectroscopy (XPS) and X-ray absorption near edge structure (XANES) to determine the effects upon electrons and structures. The results of each of Example 1 non-exposed to the oxidation potential and Example 1 after the exposure to the oxidation potential and catalytic activation are shown in FIG. 4. FIG. 4 shows XPS image (portions a and b) before/after the exposure to the oxidation potential, XANES data and extended X-ray absorption fine structure (EXAFS) data (portions c and d) before/after the exposure to the oxidation potential.

The CoP/C catalyst before the exposure to the oxidation potential will be described first. As can be seen from portions a and b of FIG. 4, the XPS results of CoP shows that surface oxidation occurs spontaneously to produce oxidized phosphorus and cobalt species. Most of the detected signals are derived from the outer amorphous layer. First, P2p region of CoP/C shows signals of predominant metaphosphate species (see, portion b, FIG. 4). In addition, Co 2p3/2 result shows that contribution of cobalt metal (0) may be neglected in CoP/C. The Co peak at about 782 eV corresponds to Co(II), a cobalt species bound to oxygen. The amorphous surface of the CoP/C may be regarded as a combination of cobalt phosphate and cobalt oxide species. Compatibly with the XPS results, XANES results show that oxidized cobalt corresponding to a divalent species is present near the surface of CoP/C (see, portion c, FIG. 4). The presence of phosphorus facilitates the oxidation. It is thought that the surface oxidation occurs due to the oxaphilic property of the external region of phosphorus species.

When the catalyst is exposed to the oxidation potential, it can be seen that the material undergoes a significant change in electronic structure through the rapid oxidative conversion as determined from Test Examples 1 and 2. The XPS signals of cobalt suggest that the material undergoes conversion to an oxide structure, in which a trivalent species is predominant rather than a divalent species, upon the exposure to the oxidation potential. The signals of phosphorus also demonstrate conversion of a structure from metaphosphate to phosphate. Compatibly with the above results, the edge position of signals in the XANES spectrum shows that the material is converted into a trivalent or higher oxide structure. Particularly, it can be seen from EXAFS analysis that the catalyst structure is changed into the structure of an active Co—P catalyst after the oxygen evolution reaction (portion e, FIG. 4).

[Test Example 4] Evaluation for Oxygen Evolution Reaction Polarization

To determine the oxygen evolution reaction activity of the catalyst disclosed herein, the cobalt-containing materials according to Examples 1 are evaluated in an alkaline solvent. For the purpose of comparison, Pt/C and Ir/C catalysts are also evaluated. The results are shown in portion a, FIG. 5.

Portion a of FIG. 5 shows the polarization curve in oxygen evolution reaction for each of the cobalt-containing catalyst disclosed herein and commercially available Pt/C and Ir/C catalysts, when each catalyst is loaded on glass carbon to function as an electrode (loading: ~0.05 $mg_{Co}/cm^2$ and ~0.08 $mg_{Pt, Ir}/cm^2$). The polarization is determined on a rotary disc electrode (RDE) in 0.1M KOH solution (pH 13) at 25° C. under a sweep rate of 5 mV/s. In portion a of FIG. 5, the linear sweep in the direction of an anode shows that CoP/C has higher oxygen evolution reaction activity as compared to the other catalysts, and thus has higher current and more rapid current onset of catalyst. In addition, CoP/C accomplishes a current density of 10 $mAcm^{-2}$ which is the value used as a standard determination reference in general oxygen evolution reaction. Such quality is similar to the highest quality found in the known cobalt-containing catalysts and even is equivalent to the quality of an iridium precious metal-based catalyst (WC).

In addition, portion b of FIG. 5 shows the Tafel plot of the catalyst disclosed herein derived from portion a of FIG. 5: Tafel plots of CoP/C (66 mV/dec) and $Co_3O_4$ (73 mV/dec) show a similar slope, which suggests that the cobalt-containing materials undergo similar oxygen evolution reaction. It can be seen that the cobalt-containing materials show more efficient OER kinetics as compared to Ir/C (89 mV/dec).

[Test Example 5] Durability Evaluation for Oxygen Evolution Reaction

To determine the durability of the catalyst disclosed herein, evaluation for the durability of CoP/C is carried out and the results are shown in FIG. 5 (portions c and d). The determination is carried out in 0.1M KOH solution (pH 13) at a sweep rate of 5 mV/s. As a control, Ir/C (20 wt %, Premetek) is also determined. While Ir/C undergoes an overvoltage increase of about 40 mV, CoP/C shows a neglectably small decrease in quality even after 1000 cycles in a high voltage range (1.3-1.7V, 100 $mVs^{-1}$), and maintains high quality even after the continuance of 3000 cycles without any significant decrease in quality. Moreover, CoP/C maintains stability even under a bulk electrolysis condition that continues for 12 hours. It is determined that the catalyst disclosed herein still maintains a porous nanoweb structure after the durability evaluation (portion e, FIG. 5).

[Test Example 6] Evaluation for Hydrogen Evolution Reaction Polarization and Durability Evaluation for Hydrogen Evolution Reaction To determine the hydrogen evolution reaction activity of the catalyst disclosed herein, the cobalt-containing materials according to examples 1 are evaluated in an alkaline solvent. For the purpose of comparison, Pt/C catalyst is also evaluated. The results are shown in portion a, FIG. 6.

Figure 6:
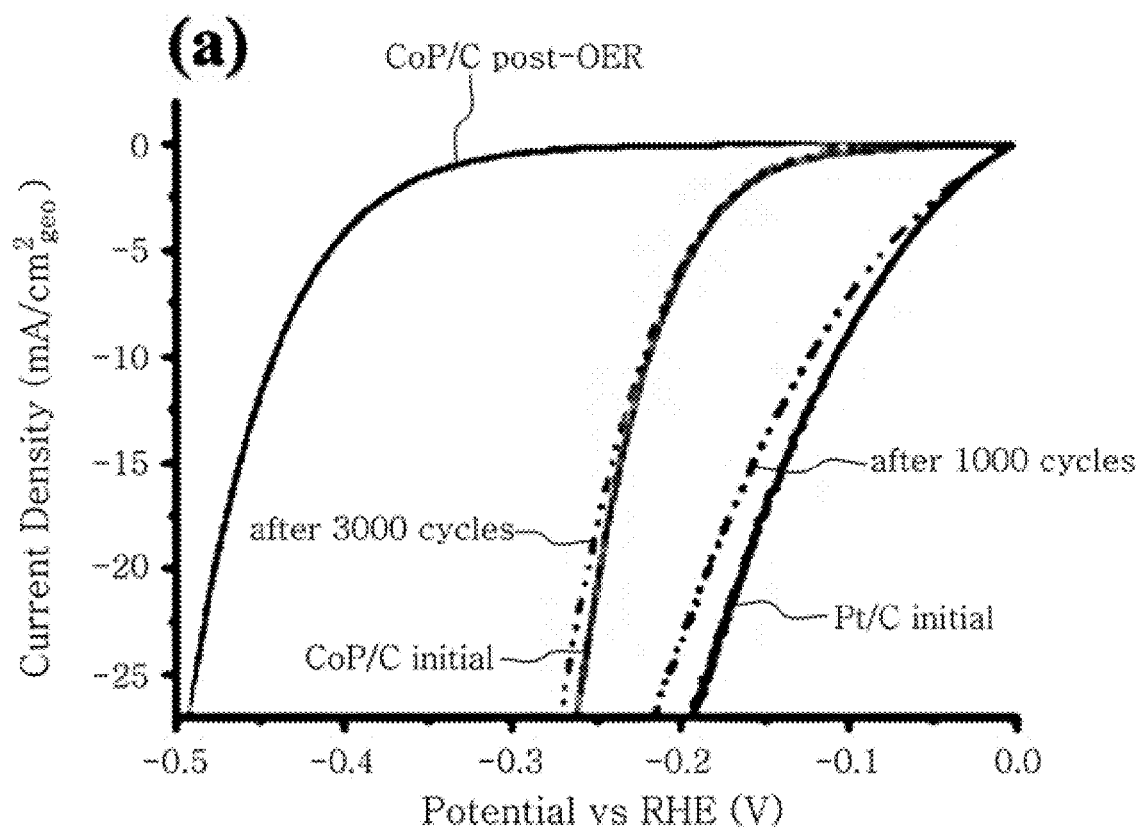
FIG. 6 shows a hydrogen evolution reaction polarization curve (portion a), and TEM image after the durability evaluation (portions b and c), for the present CoP/C.
Figure 6:
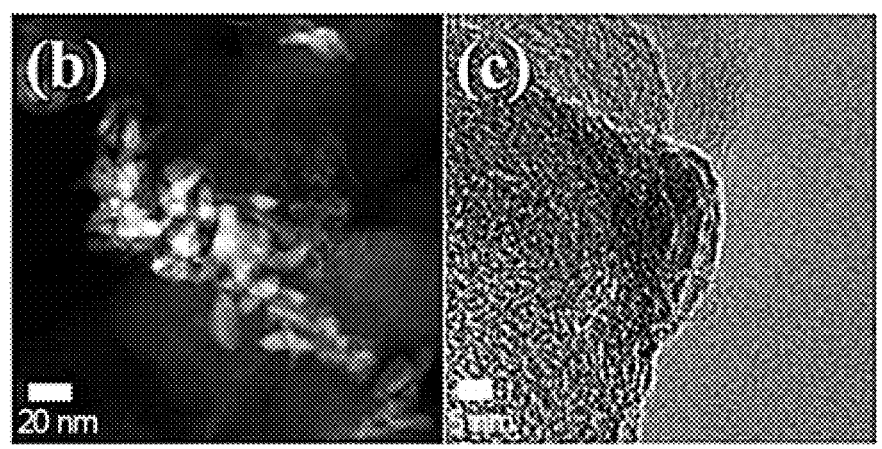
Figure 7:
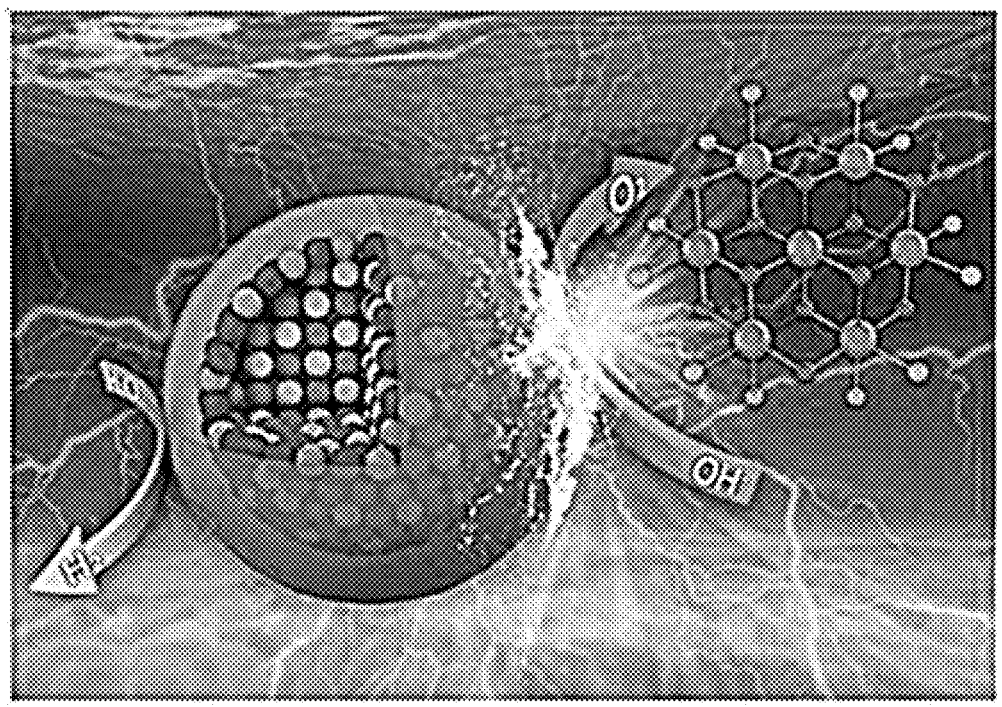
FIG. 7 is a schematic view illustrating the principle of the catalyst for hydrogen and oxygen evolution according to an embodiment.

Portion a of FIG. 6 shows the polarization curve in hydrogen evolution reaction for each of the cobalt-containing catalyst disclosed herein and commercially available Pt/C catalyst, when each catalyst is loaded on glass carbon to function as an electrode (loading: ~0.05 mg Co/cm² and ~0.016 mg Pt/cm²). The polarization is determined on a rotary disc electrode (RDE) in 0.1M KOH solution (pH 13) at 25° C. under a sweep rate of 2 mV/s. In portion a of FIG.

6, the linear sweep in the direction of a cathode shows that CoP/C has excellent hydrogen evolution reaction activity and even shows quality similar to the quality of Pt/C.

It can be also seen that the catalyst disclosed herein has higher durability as compared to Pt/C through the accelerated durability test (portion a, FIG. 6). In the case of CoP/C, it shows a neglectably small decrease in quality in the HER region (0.05 to ~0.35V, 100 mVs$^{-1}$) even after 3000 cycles. On the contrary, Pt/C shows a larger decrease in quality as compared to CoP/C. It can be seen that CoP/C maintains the shape of nanoparticles and surface amorphous layer even after the durability evaluation (portions b and c, FIG. 6).

What is claimed is:

1. A non-precious metal based water electrolysis catalyst represented by the following Chemical Formula 1 for evolution of hydrogen and oxygen at a cathode and anode, respectively, the catalyst comprising a cobalt-containing compound fixed to a carbon carrier:

CoX/C [Chemical Formula 1]

wherein X is at least one selected from the group consisting of P, O, B, S and N,
wherein the cobalt-containing compound is nanoparticles surrounded with an amorphous layer having a thickness of 0.1-7 nm, and the amorphous layer comprises Co, X and O.

2. The non-precious metal based water electrolysis catalyst according to claim 1, wherein X in the above formula is at least one selected from the group consisting of P, B, S and N.

3. The non-precious metal based water electrolysis catalyst according to claim 1, wherein X in the above formula is P.

4. The non-precious metal based water electrolysis catalyst according to claim 1, wherein the cobalt-containing compound is nanoparticles having a particle size of 5-100 nm.

5. The non-precious metal based water electrolysis catalyst according to claim 1, wherein the cobalt-containing compound is nanoparticles having a particle size of 5-30 nm.

6. The non-precious metal based water electrolysis catalyst according to claim 1, wherein the cobalt-containing compound further has oxide of X on the surface thereof.

7. The non-precious metal based water electrolysis catalyst according to claim 1, wherein the cobalt-containing compound has phosphate on the surface thereof.

8. The non-precious metal based water electrolysis catalyst according to claim 1, which is used in an alkaline solvent.

9. The non-precious metal based water electrolysis catalyst according to claim 1, which has cobalt having an oxidation number of 3 or more through activation at the oxidation potential.

10. The non-precious metal based water electrolysis catalyst according to claim 1, which is porous and has a nanoweb structure.

* * * * *